(12) United States Patent
Scothern et al.

(10) Patent No.: US 9,133,939 B2
(45) Date of Patent: Sep. 15, 2015

(54) SEAL

(75) Inventors: David P Scothern, Derby (GB); Neil R Fomison, Derby (GB)

(73) Assignee: ROLLS-ROYCE plc, London (GB)

( * ) Notice: Subject to any disclaimer, the term of this patent is extended or adjusted under 35 U.S.C. 154(b) by 647 days.

(21) Appl. No.: 12/588,050

(22) Filed: Oct. 1, 2009

(65) Prior Publication Data

US 2010/0090415 A1  Apr. 15, 2010

(30) Foreign Application Priority Data

Oct. 14, 2008 (GB) .................................. 0818726.2

(51) Int. Cl.
F16J 15/42 (2006.01)

(52) U.S. Cl.
CPC ....................................... F16J 15/42 (2013.01)

(58) Field of Classification Search
CPC ................................. F16J 15/162; F16J 15/42
USPC .................................. 277/431, 427–429, 424
See application file for complete search history.

(56) References Cited

U.S. PATENT DOCUMENTS

| | | | | |
|---|---|---|---|---|
| 822,802 A * | 6/1906 | Wilkinson | .................... | 277/427 |
| 1,558,630 A * | 10/1925 | Reed | ................ | 277/427 |
| 1,749,586 A * | 3/1930 | Johnson | ........................ | 277/412 |
| 2,573,425 A * | 10/1951 | Fletcher, Jr. | .................. | 277/424 |
| 2,823,052 A * | 2/1958 | Collman | ........................ | 277/428 |
| 3,476,396 A * | 11/1969 | Wilhelm | ........................ | 277/430 |
| 4,076,260 A * | 2/1978 | Legoy et al. | .................. | 277/425 |
| 4,398,873 A * | 8/1983 | Siegel | .............................. | 418/81 |
| 4,570,947 A * | 2/1986 | Smith | .......................... | 277/428 |
| 6,164,658 A * | 12/2000 | Collin | .......................... | 277/418 |
| 6,568,688 B1 | 5/2003 | Boeck | | |
| 6,921,079 B2 | 7/2005 | Rensch | | |
| 7,159,873 B2 * | 1/2007 | McCutchan | .................. | 277/427 |
| 7,344,139 B2 * | 3/2008 | Gaebler et al. | ................. | 277/431 |
| 2003/0168815 A1 * | 9/2003 | Rensch | ........................ | 277/409 |
| 2009/0189356 A1 | 7/2009 | Gaebler et al. | | |
| 2010/0090415 A1 * | 4/2010 | Scothern et al. | ............. | 277/431 |

FOREIGN PATENT DOCUMENTS

| | | |
|---|---|---|
| DE | 2 343 724 | 11/1974 |
| DE | 10 2005 047 696 A1 | 3/2007 |
| EP | 2 071 131 A2 | 6/2009 |
| GB | 1 212 593 | 11/1970 |
| GB | 2125118 A * | 2/1984 |
| JP | 62261765 * | 11/1987 |

OTHER PUBLICATIONS

European Search Report mailed Jan. 25, 2010 for European Application No. EP 09 25 2342.

* cited by examiner

*Primary Examiner* — Kristina Fulton
*Assistant Examiner* — Nicholas L Foster
(74) *Attorney, Agent, or Firm* — Oliff PLC

(57) ABSTRACT

A hydraulic seal arrangement for a rotating machine, particularly a gas turbine engine, comprises a hydraulic seal and a hydraulic trap. When the machine is shut down, oil is retained in the hydraulic trap. When the machine is restarted, the oil from the hydraulic trap is available to re-make the hydraulic seal, thereby reducing or avoiding the leakage that typically occurs in such seal arrangements until the flow of oil through the seal arrangement is re-established.

8 Claims, 5 Drawing Sheets

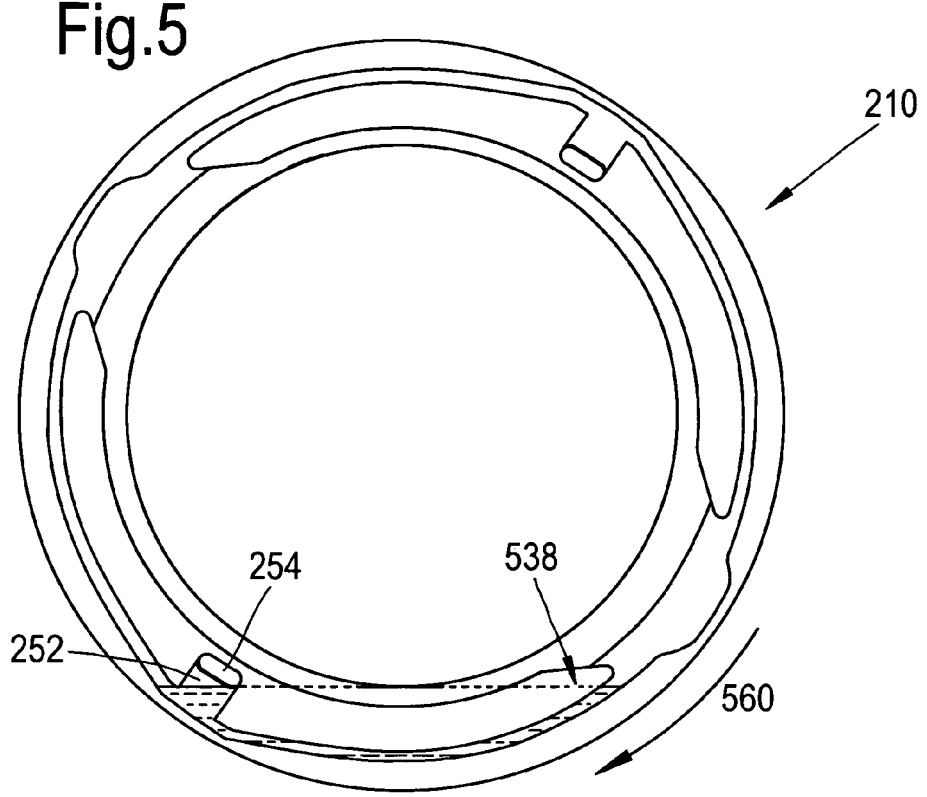
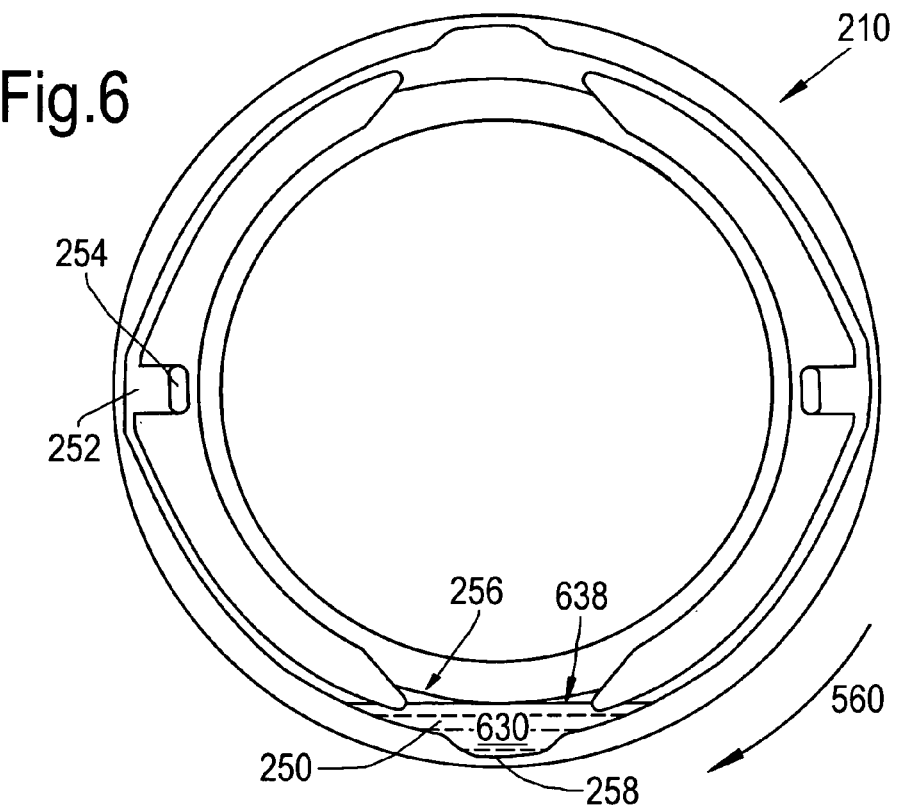

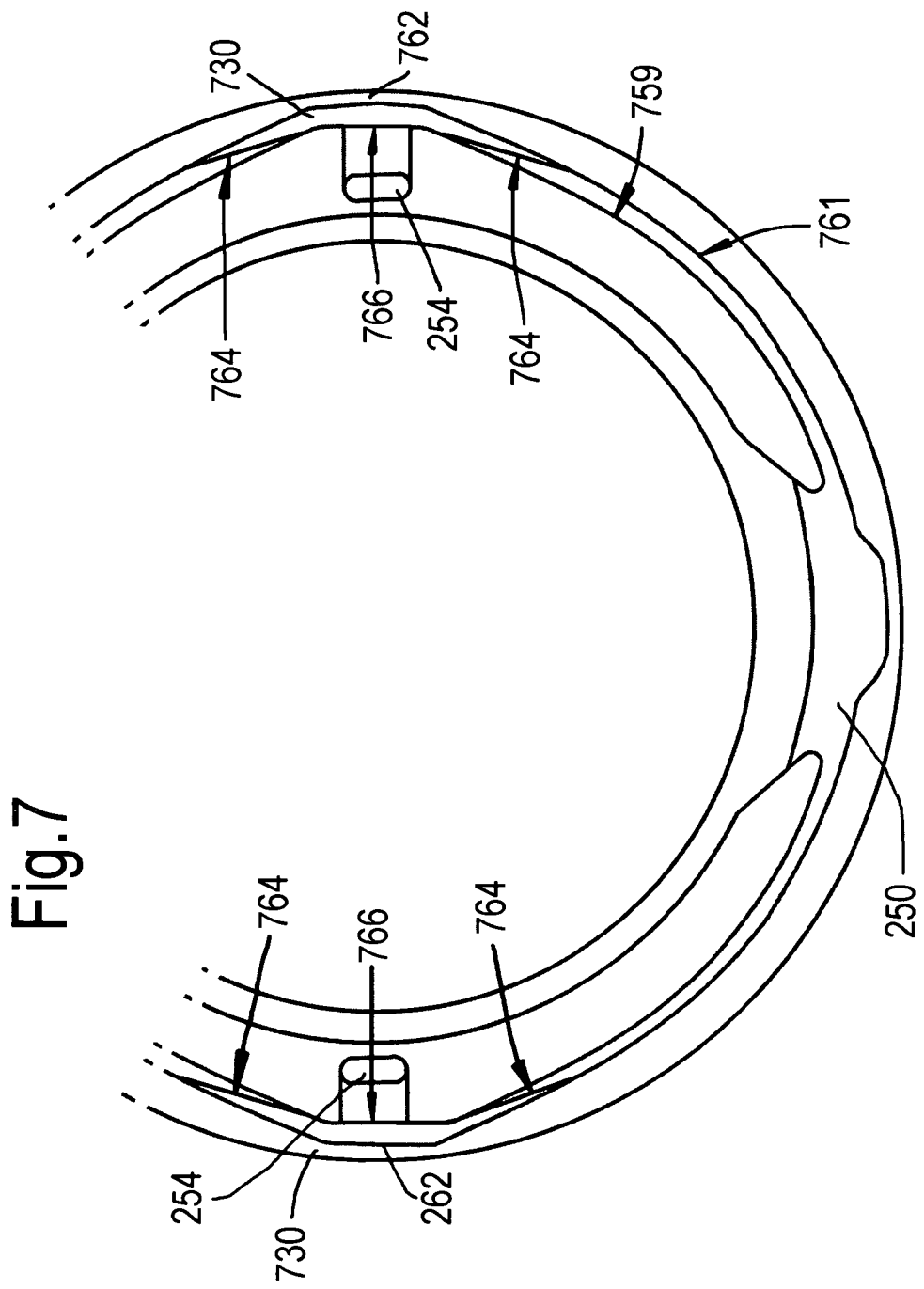

SEAL

TECHNICAL FIELD

This invention relates to seals. In particular, although not exclusively, it relates to hydraulic seals of the type used to provide a seal between two relatively rotating shafts.

BACKGROUND ART

It is known to use a hydraulic seal to seal between two relatively rotating shafts. U.S. Pat. No. 6,568,688 describes such a seal, in which oil is continuously fed from the low-pressure side of the seal, passes through the seal to provide cooling, and is recovered to the low-pressure side of the seal for scavenging.

FIG. 1 is a sectional view, at top dead centre, of a known hydraulic seal arrangement, as described in U.S. Pat. No. 6,568,688. A low pressure shaft 12 and a high pressure shaft 14 are concentric shafts of a two-shaft gas turbine engine, rotating at different speed about a common axis of rotation 16. The high pressure shaft 14 is supported on a bearing 18.

To the right-hand side of bearing 18, and radially outward of high pressure shaft 14, is a region 20 of relatively low pressure; and to the left-hand side of bearing 18, and radially inward of high pressure shaft 14, is a region 22 of relatively high pressure. The two regions and 22 must be effectively sealed from each other in operation, and to achieve this a hydraulic seal, indicated generally by 24, is provided between the two shafts 12 and 14.

The hydraulic seal 24 comprises an annulus 26 which is provided in the interior of the high pressure shaft 14 and extends radially outwards across the whole circumference of the shaft 14. The annulus is defined by radially inwardly extending walls 27, which extend around the whole circumference of the shaft 14. Projecting into the annulus 26 is a web 28 which is arranged on the low pressure shaft and extends radially outward across the whole circumference of the shaft 12.

In operation, a large portion of the annulus 26, and especially that portion of it that surrounds the free end of the web 28, is filled with oil or some other hydraulic medium 30, as indicated by the hatched area.

In operation, a continuous feed of oil is maintained into the annulus 26, in the following manner. An oil jet (not shown) between the two shafts 12, 14 delivers oil in the direction shown by the arrow 32. Some of this oil serves to lubricate the bearing 18; the remainder tends to collect on the inner wall 34 of the high pressure shaft 14, owing to the centrifugal effects arising out of the rotation of the shafts 12, 14. The inner wall 34 lies at the radially outward side of the space between shafts 12 and 14.

It is also possible, in an alternative embodiment of the known arrangement, for the oil to be fed in along the centre of the hollow shaft 12.

Again under centrifugal effect, oil also enters the annulus 26 through an annular inlet area 36, the annulus 26 lying still further radially outward than the inner wall 34. In the process, the oil 30 collects in the annulus 26 both to the left and to the right sides of the web 28, creating an optimum siphon-type hydraulic seal as shown.

It will be appreciated that the radially inwardly extending side walls defining the annulus 26 act as weirs and limit the oil level within the annulus. The surface or liquid level of the oil, on each side of the web 28, will be ultimately constrained by the radially inward extension of the respective side wall. This can be seen in the annular inlet area 36.

On the left-hand side of the web 28, the surface or liquid level 38 of the oil 30 is further radially outward than on the right-hand side of the web 28, because the left-hand side communicates with the region 22, in which the pressure is higher than in the area 20 with which the right-hand side is in communication.

A scoop plate 40 in the annulus 26 defines a passageway 42, through which excess oil can flow to an outlet duct 44. In this way, a continuous flow of oil is maintained through the hydraulic seal 24. (Other ways of achieving throughflow are known, and will be familiar to the skilled reader of this specification; for example, oil may flow over one of the weirs, typically on the opposite side of the web 28 to the oil jet.) This prevents undesirable overheating and coking of the oil 30, which would occur if the oil was allowed to remain for too long within the annulus 26. In general, the amount of heat transferred to the oil is highly dependent on the depth of immersion of the fin 28 in operation.

TECHNICAL PROBLEM

A problem with known hydraulic seal arrangements, as shown in FIG. 1 and described above, is that at engine shutdown, the centrifugal effects that maintain the seal cease, and consequently the seal collapses under gravity. Oil will collect in the bottom of the seal to the level of the largest-diameter weir (i.e. that weir which, viewed from the bottom dead centre of the engine, extends least far in the radially inward direction). Any excess oil will overflow the weir and be lost. When the engine is restarted, the centrifugal effects will cause the retained oil to be evenly distributed around the circumference of the seal arrangement. If the amount of retained oil is insufficient to remake an effective hydraulic seal (by submerging the web), then the seal will leak until enough new oil has been delivered into the annulus.

If the weir diameter is made smaller (i.e. the weir is made to extend further radially inward), then more oil can be retained at shutdown, and so the seal can be remade more quickly; but a smaller diameter weir will cause the web to be more deeply immersed in the oil during normal running, and this will increase the amount of heat transferred to the oil during normal running.

The design of hydraulic seal arrangements has in the past been constrained by the need to balance these two contradictory and undesirable situations, avoiding on the one hand a seal that leaks at start-up and on the other a seal that transfers excessive heat to the oil in use.

BRIEF SUMMARY OF THE INVENTION

The inventors have devised a hydraulic seal arrangement that reduces or substantially overcomes the problems associated with known hydraulic seal arrangements, permitting a seal without excessive immersion of the web during normal running, but in which sufficient oil can be retained on shutdown to permit an effective hydraulic seal to be remade almost immediately when the engine is restarted.

The invention provides a hydraulic seal arrangement as set out in the claims.

BRIEF DESCRIPTION OF THE SEVERAL VIEWS OF THE DRAWINGS

So that the operation of the invention may be more clearly understood, an exemplary embodiment will now be described with reference to the accompanying drawings, in which:

FIG. 5 shows the hydraulic seal arrangement of FIG. 2 in a first condition, following engine shutdown;

FIG. 6 shows the hydraulic seal arrangement of FIG. 2 in a second condition, following engine shutdown; and FIG. 7 shows the hydraulic seal arrangement of FIG. 2 in a third condition, following engine restart.

DESCRIPTION OF THE EMBODIMENTS

Figure 2:
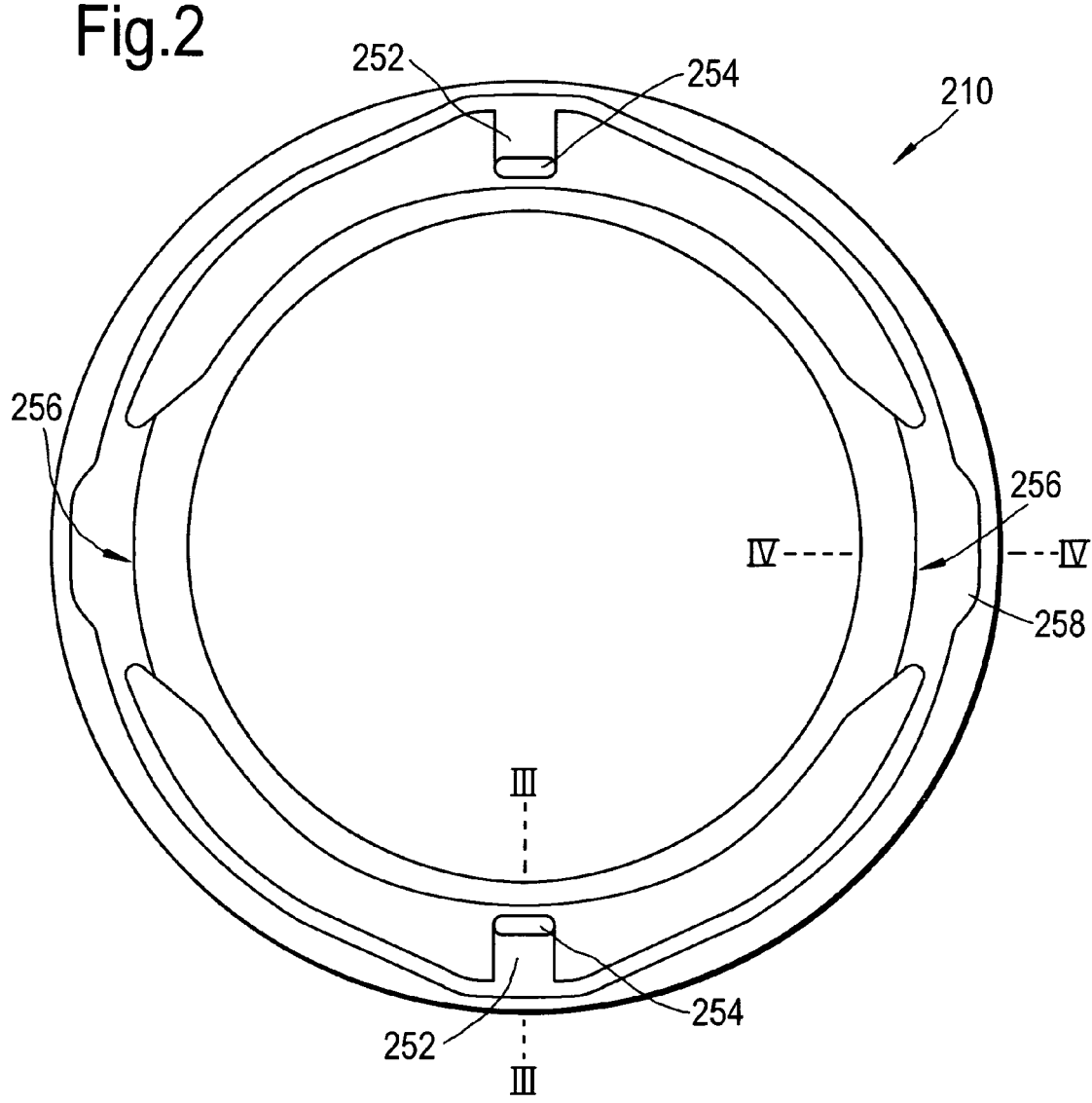
FIG. 2 is a section through a hydraulic seal arrangement according to the invention.

Referring first to FIG. 2, a hydraulic seal arrangement according to the invention is shown generally at 210.

Figure 1:
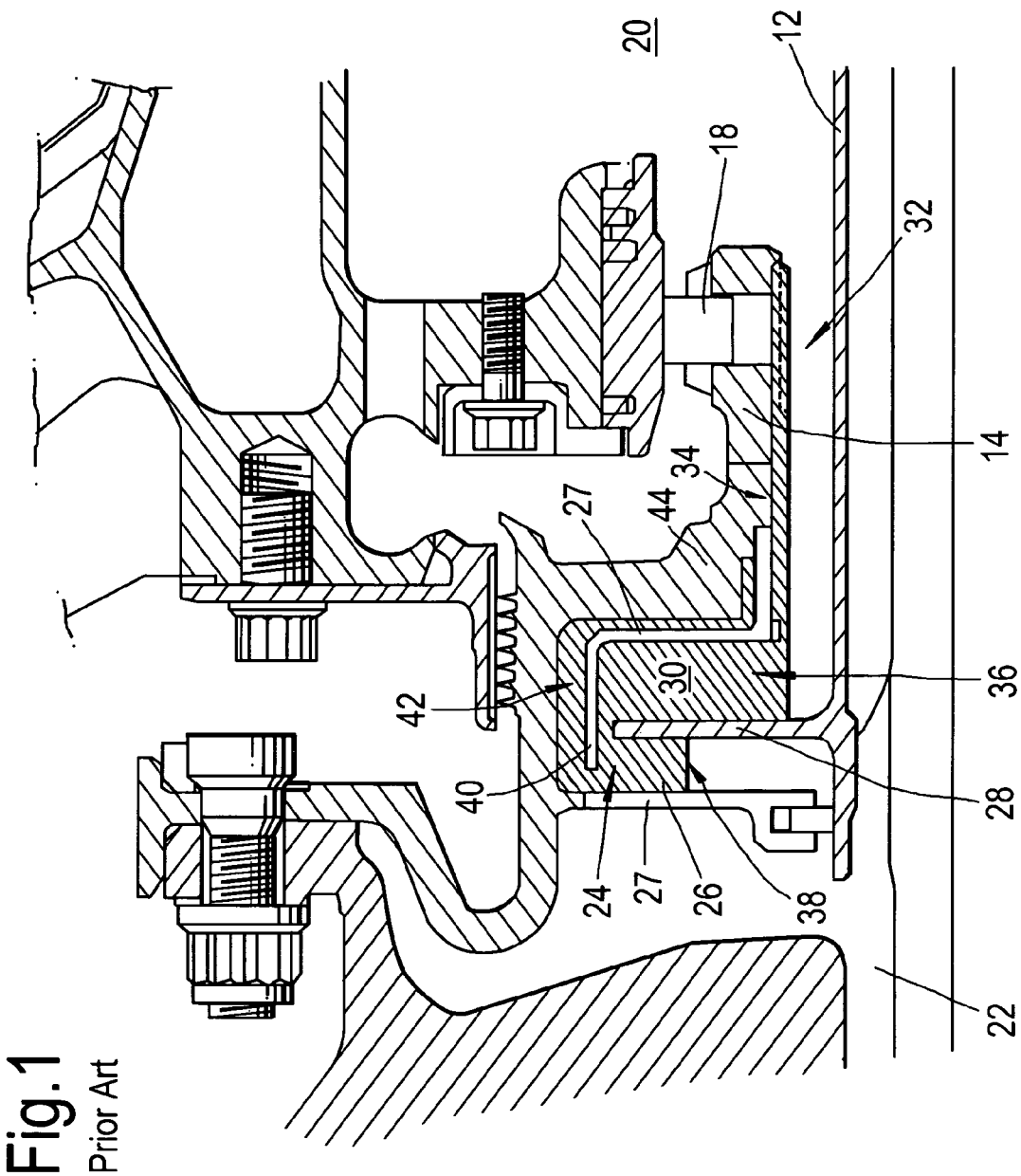
FIG. 1 is a section of a known hydraulic seal arrangement.
Figure 3:
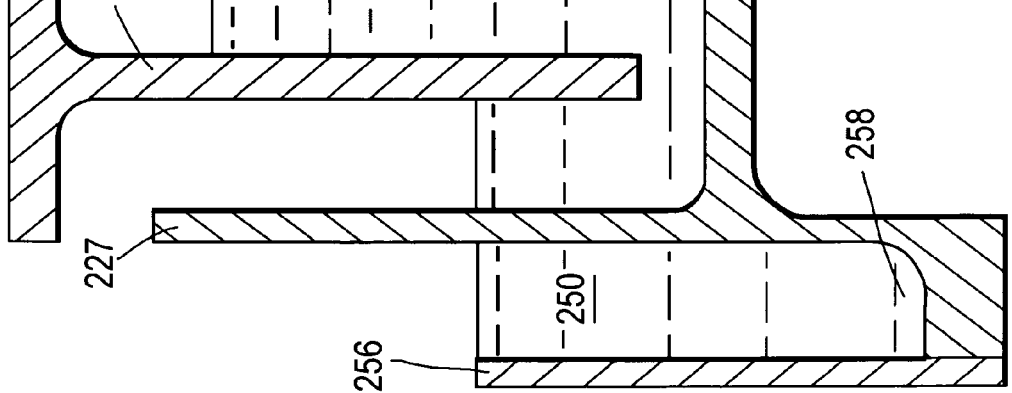
FIG. 3 is a cross-section on the line of FIG. 2.

FIG. 3 is a cross-section on the line III-III of FIG. 2. As in the embodiment shown in FIG. 1, radially inwardly extending walls 227 define an annulus 226, and a radially outwardly extending web 228 extends between the walls 227.

A hydraulic seal exit weir 252 defines a passage 254, and in use excess oil can flow through this passage for scavenging. Two first passages 254 are provided, at diametrically opposite positions of the seal assembly 210, as can more clearly be seen in FIG. 2.

Oil flowing out of the seal arrangement 210 over the exit weir 252 enters a hydraulic trap 250. The trap 250 extends around the whole circumference of the seal arrangement 210. At two diametrically opposed positions of the seal assembly 210, and spaced at 90° from the passages 254, are two hydraulic trap exit weirs 256 defining two second passages. In use, excess oil from the hydraulic trap 250 will flow over these weirs 256 for scavenging. The scavenging means is not shown, but performs essentially the same function as in the embodiment of FIG. 1. In the region of each weir 256 a pocket 258 is provided in the hydraulic trap 250, by extending the hydraulic trap 250 further radially outward than over the rest of the circumference. The purpose of these pockets 258 will be explained presently.

In operation, centrifugal effects will maintain an effective hydraulic seal across the annulus 226.

FIG. 5 illustrates the operation of a seal arrangement according to the invention, after engine shutdown and just before the arrangement comes to a standstill. The seal arrangement is rotating slowly clockwise, as shown by the arrow 560.

Figure 4:
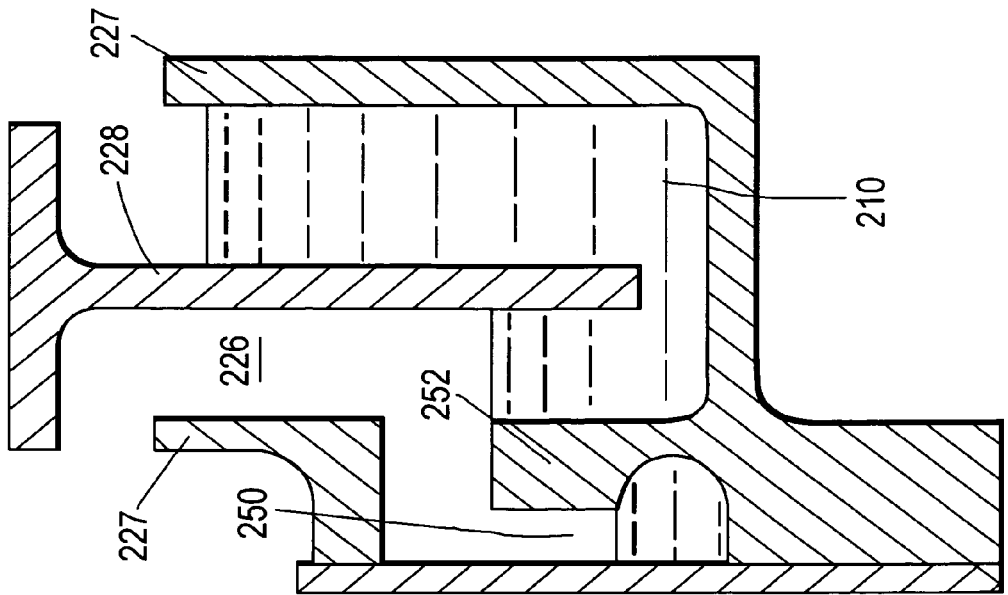
FIG. 4 is a cross-section on the line IV-IV of FIG. 2, as it would appear if this part of the seal arrangement were at bottom dead centre.

In the absence of centrifugal effects, substantially all the oil in the seal arrangement has collected in the bottom of the seal arrangement 210 with a surface or liquid level 538. As described above with reference to FIG. 3, when the passage 254 in the hydraulic seal exit weir 252 is below the liquid level 538, oil will flow from the annulus 226 of the seal arrangement into the hydraulic trap 250 until the liquid levels are equal. As the seal arrangement rotates in the direction of the arrow 560, the weir 252 and therefore the passage 254 rise above the liquid level 538, as shown in FIG. 5. There is now no communication path between the annulus 226 and the hydraulic trap 250 (as may be seen in FIG. 4) and so no further oil can escape from the annulus 226 of the seal arrangement 210.

FIG. 6 shows the arrangement of FIG. 5 when it has rotated by a further 65 degrees or so in the direction of the arrow 560. A quantity of oil 630 is retained in the hydraulic trap 250, up to a liquid level 638. Because the hydraulic trap exit weir 256 is now at bottom dead centre, any excess oil will escape over the weir 256 for scavenging.

The presence of the pockets 258 increases the amount of oil 630 that can be retained in the hydraulic trap 250, when the hydraulic trap exit weir 256 is at bottom dead centre. Because the rest of the circumference of the hydraulic trap 250 does not have pockets 258, the liquid level will be higher when any other part of the hydraulic trap 250 is a bottom dead centre. This can be seen by comparing the liquid level 538 in FIG. 5 with the liquid level 638 in FIG. 6. The advantage of this is that the relatively high liquid level 538, when the hydraulic seal exit weir 252 is at or near bottom dead centre, will prevent further oil leakage out of the hydraulic seal annulus 226; while the relatively low liquid level 638, when the hydraulic trap exit weir 256 is at or near bottom dead centre, will prevent oil leakage out of the hydraulic trap 250. If the pockets 258 were not provided and the liquid level were uniform, the trap 250 would spill a small volume of oil each time its exit weir 256 approached bottom dead centre, which would be refilled from the hydraulic seal 226 as its exit weir 252 approached bottom dead centre. In this way, the hydraulic seal annulus 226 could slowly drain until it retained insufficient oil to re-make the hydraulic seal on startup. The provision of the pockets 258, and the consequent changing of the liquid level in the hydraulic trap 250, ensures that no oil is lost either from the hydraulic seal annulus 226 or from the hydraulic trap 250, and therefore that enough oil is retained in the hydraulic seal annulus 226 to re-make the hydraulic seal immediately the gas turbine engine is restarted.

FIG. 7 illustrates a further, optional feature of a seal arrangement according to the invention. The radially inner wall 759 of the hydraulic trap 250, in the region of each of the two first passages 254, is moved radially outwards. The radially outer wall 761 of the hydraulic trap 250 is similarly moved radially outwards so that a recess or U-trap 762 is formed in the region of each of the two first passages 254. It can be seen that within the recesses 762, the radially inner wall 759 lies radially outward of the normal radial position of the radially outer wall 761 around the rest of the circumference. When the gas turbine engine is started up, some of the oil 730 from the hydraulic trap 250 will flow into the recesses 762. Centrifugal forces 764 act against the forces 766 (which arise because the pressure in the hydraulic seal annulus 226 is higher than that in the hydraulic trap 250) so that the two regions 730 of oil act to seal the passage 254 in the hydraulic seal exit weir 252. This prevents the leakage of air out of the hydraulic seal annulus 226 into the hydraulic trap 250, which would otherwise occur until the flow of oil is re-established through the seal arrangement 210 (as described above with reference to FIG. 3.

It will be appreciated that various modifications may be made to the embodiments described in this specification without departing from the essential principles of the invention.

In the embodiment of the invention described, two weirs are provided between the seal and the trap, and two between the trap and the scavenge. The invention may alternatively be put into effect with a different number of weirs in either of these two locations.

The weirs in the embodiment described are separated at degrees from one another, but may be at different angular separations.

It would be possible to put the invention into effect with a fully annular weir in either position or in both (seal-trap and trap-scavenge). In such a configuration, it would not be possible to incorporate the optional feature shown in FIG. 7, and consequently the seal would be prone to transient leakage at startup; but the essential benefits of the invention would still be achieved.

The invention claimed is:

1. A hydraulic seal arrangement for a rotating machine comprising:
   an annular hydraulic seal comprising radially inwardly extending walls and a radially outwardly extending web, the walls and the web defining a hydraulic fluid filled space therebetween filled with oil such that, in operation, the oil prevents leakage of other fluids across the space;
   a hydraulic trap, wherein:
      the hydraulic seal has a U-shaped cross-section comprising the walls and the web is located between the walls;
      the walls and the web are relatively rotatable and define the space therebetween that is sealed with the oil:
      the hydraulic seal is arranged to prevent leakage from the hydraulic seal into the hydraulic trap when the machine is shut down;
      the hydraulic trap is arranged to retain the oil from the hydraulic seal when the machine is shut down; and
      the hydraulic trap comprises at least one pocket that extends circumferentially to a greater extent than a radial depth and extends circumferentially around part, but not all, of the circumference of the hydraulic seal to increase the amount of oil that can be retained; and
   two first passages in fluid communication between the hydraulic seal and the hydraulic trap, wherein the two first passages are at diametrically opposite positions.

2. The hydraulic seal arrangement as claimed in claim 1, in which the hydraulic trap operates to minimise leakage through the hydraulic seal when the machine is restarted.

3. The hydraulic seal arrangement as claimed in claim 1, in which the hydraulic trap is axially adjacent to the hydraulic seal.

4. The hydraulic seal arrangement as claimed in claim 1, in which the rotating machine is a gas turbine engine.

5. A hydraulic seal arrangement for a rotating machine comprising:
   an annular hydraulic seal comprising radially inwardly extending walls and a radially outwardly extending web, the wall walls and the web defining a hydraulic fluid filled space therebetween filled with oil such that, in operation, the oil prevents leakage of other fluids across the space;
   a hydraulic trap, wherein:
      the hydraulic seal has a U-shaped cross-section comprising the walls and the web is located between the walls;
      the walls and the web are relatively rotatable and define the space therebetween that is sealed with the oil:
      the hydraulic seal is arranged to prevent leakage from the hydraulic seal into the hydraulic trap when the machine is shut down;
      the hydraulic trap is arranged to retain the oil from the hydraulic seal when the machine is shut down; and
      the hydraulic trap comprises at least one pocket that extends circumferentially to a greater extent than a radial depth and extends circumferentially around part, but not all, of the circumference of the hydraulic seal to increase the amount of oil that can be retained;
   two first passages in fluid communication between the hydraulic seal and the hydraulic trap; and
   two second passages in fluid communication with the hydraulic trap,
   wherein the two first passages are at diametrically opposite positions and in which the two second passages are spaced at 90 degrees from the two first passages.

6. The hydraulic seal arrangement as claimed in claim 5, in which the disposition of the first and second passages is such as to prevent leakage of oil out of the arrangement when the machine is shut down.

7. A hydraulic seal arrangement for a rotating machine comprising:
   an annular hydraulic seal comprising radially inwardly extending walls and a radially outwardly extending web, the wall walls and the web defining a hydraulic fluid filled space therebetween filled with oil such that, in operation, the oil prevents leakage of other fluids across the space;
   a hydraulic trap, wherein:
      the hydraulic seal has a U-shaped cross-section comprising the walls and the web is located between the walls;
      the walls and the web are relatively rotatable and define the space therebetween that is sealed with the oil:
      the hydraulic seal is arranged to prevent leakage from the hydraulic seal into the hydraulic trap when the machine is shut down;
      the hydraulic trap is arranged to retain the oil from the hydraulic seal when the machine is shut down; and
      the hydraulic trap comprises at least one pocket that extends circumferentially to a greater extent than a radial depth and extends circumferentially around part, but not all, of the circumference of the hydraulic seal to increase the amount of oil that can be retained;
   two first passages in fluid communication between the hydraulic seal and the hydraulic trap; and
   a U-trap in the region of each first passage.

8. The hydraulic seal arrangement as claimed in claim 7, in which the U-traps act to reduce or prevent leakage of air from the hydraulic seal into the hydraulic trap when the machine is restarted.

* * * * *